Figure 3:
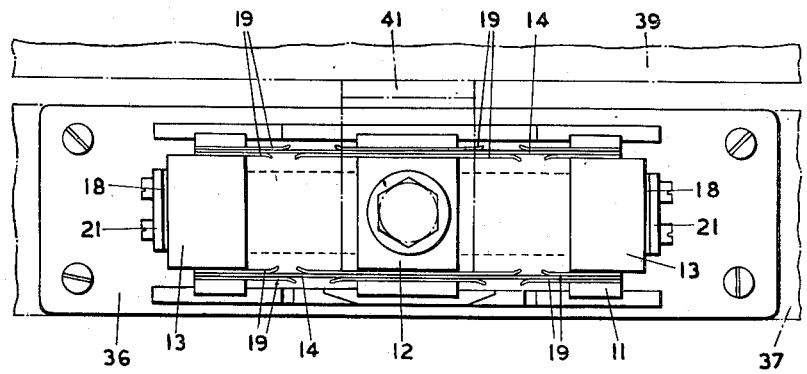

April 4, 1961
R. J. PLASTOW
2,978,241
LOW STIFFNESS SPRING UNITS
Filed June 22, 1959
2 Sheets-Sheet 1
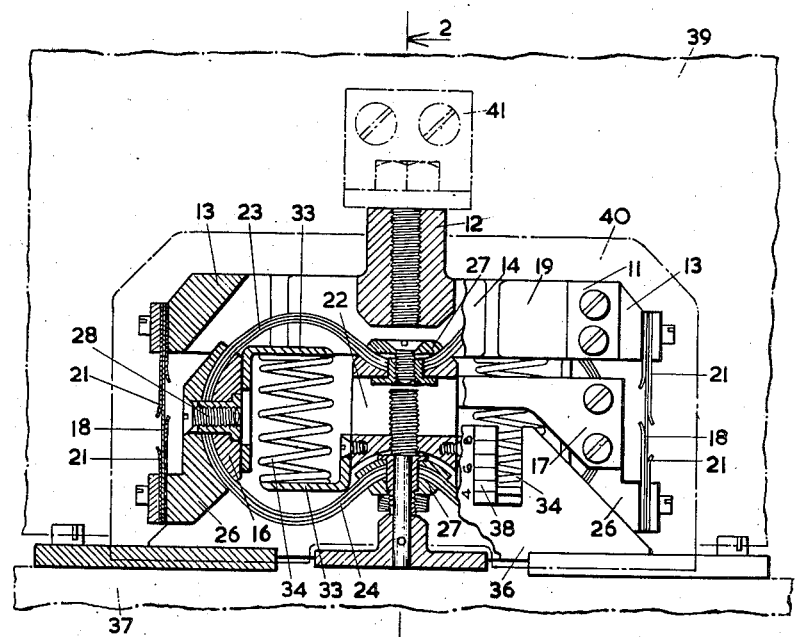
FIG. 1.
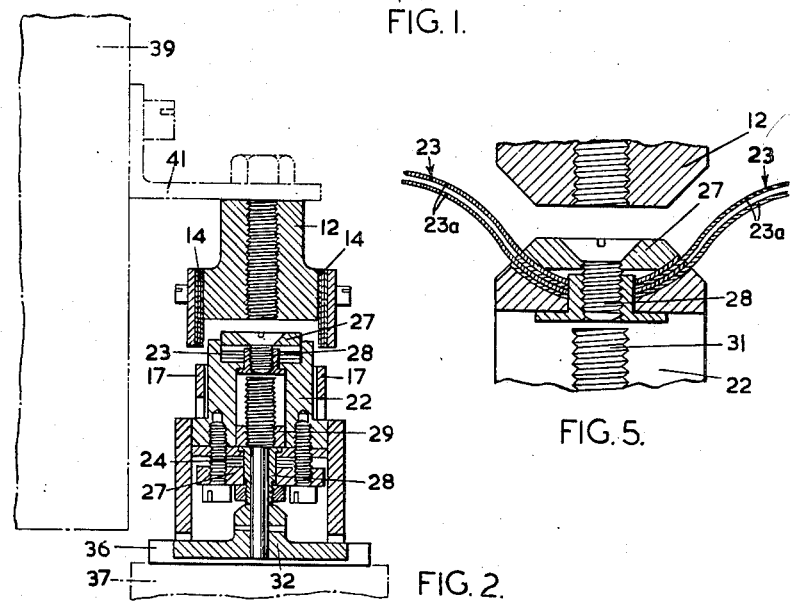
FIG. 2.
FIG. 5.

April 4, 1961  R. J. PLASTOW  2,978,241
LOW STIFFNESS SPRING UNITS
Filed June 22, 1959  2 Sheets-Sheet 2

United States Patent Office 2,978,241
Patented Apr. 4, 1961

---

2,978,241

LOW STIFFNESS SPRING UNITS

Ronald James Plastow, Gainsborough, England, assignor to Rose Brothers (Gainsborough) Limited, Gainsborough, England, a British company Filed June 22, 1959, Ser. No. 822,041

Claims priority, application Great Britain June 28, 1958

5 Claims. (Cl. 267—1)

This invention relates to low stiffness spring units which are of particular use for so called anti-vibration mountings or vibration isolators.

Low stiffness spring systems having linear springs are already known but these are impracticable for many applications. For example, in aircraft, where a supported load may be subjected to steady acceleration forces in addition to shock loads, a linear spring suspension system would require extremely large deflections to retain its low stiffness properties which would be impracticable. In many applications such as in aircraft, anti-vibration mountings are required which have low frequency characteristics not only in the direction of gravitational force but also in two mutually horizontal directions.

A low stiffness non-linear spring unit has been proposed in which a movable member is supported on a fixed member by at least two sets of naturally flat leaf springs symmetrically spaced about one of the said members, e.g., the movable member, from which they extend, one set above the other with respect to a load-supporting direction, to the other of the said members, to which said members the leaf springs are secured and by which they are constrained in an endwise buckled condition to afford low positive stiffness support characteristics in the load-supporting direction to a supported load in a datum position and increasing positive stiffness for movement of the load away from the datum position in the load-supporting direction.

Such a spring unit has been incorporated in an anti-vibration mounting with the spring unit connecting a load-supporting member to a base plate through two pairs of resilient members, the first pair connecting the load-supporting member to the spring unit and affording low positive stiffness in a first direction radially of the load-supporting direction, and the second pair connecting the spring unit to the base plate and affording low positive stiffness in a second radial direction normal to said first radial direction.

It is with the construction assembly of the sets of leaf springs in the above kind of mounting that the present invention is concerned.

According to the present invention, there is provided a low stiffness non-linear spring unit of the kind referred to in which end portions of the leaves of each set of springs extend into the two relatively movable members in interleaved relationship so that a leaf of each set serves to space apart an adjacent pair of leaves of the other set.

Provision may be made for varying the degree of buckling of the leaf springs to vary the stiffness in the load-supporting direction, and a secondary spring operative in the load-supporting direction may also be provided to assist the leaf springs to support the load.

In general, it is desirable that the resilient members referred to above also should be of naturally flat leaf spring shape in which case they will be loaded endwise to within 60 to 80 percent of their Euler buckling load to achieve the desired stiffness and low frequency characteristics in the two radial directions.

The stiffness characteristics of the mounting in the two radial directions can be further changed by providing suitably shaped abutment surfaces against which the upstanding resilient members bear as deflection takes place thus altering their linear spring characteristics.

Figure 4:
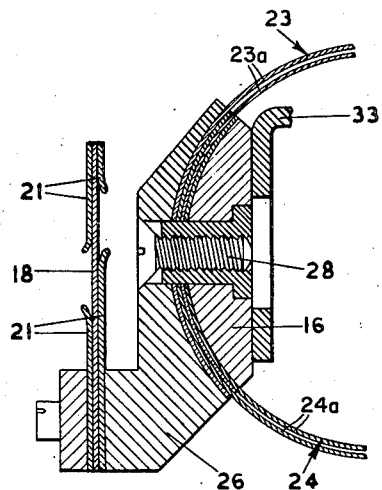

One form of low stiffness non-linear spring mounting incorporating a low stiffness spring unit according to the invention, designed as an anti-vibration mounting, will now be described in greater detail with reference to the accompanying drawings, in which:

Figure 1 is a part sectional elevation of the spring unit,
Figure 2 is a section on the line 2—2 in Figure 1,
Figure 3 is a plan of the unit, and
Figures 4 and 5 are sectional views of portions of the unit drawn to a larger scale.

A load-supporting member generally referred to by reference numeral 11 consists of upper and lower members, the upper member consisting of a central portion 12 and end portions 13 connected together by flat leaf springs 14 affording low positive stiffness in a first direction radially of the load-supporting direction, while the lower member consists of end portions 16 connected to each other by constraining bars 17. The end portions 16 are connected to the end portions 13 by flat leaf springs 18 affording low positive stiffness in a second radial direction normal to the first radial direction. Suitably shaped abutment surfaces 19 and 21 are provided to give (during vibration) non-linear spring characteristics, e.g., increasing stiffness with movement from a datum position, to the leaf springs 14 and 18, respectively.

The lower member is connected to a central support 22 by upper and lower sets of leaf springs 23 and 24 constrained by the bars 17 in an endwise buckled condition to afford low positive stiffness support characteristics in the load-supporting direction to a supported load in a datum position and increasing positive stiffness for movement of the load away from the datum position in the load-supporting direction.

The outer surfaces of the end portions 16 and the upper and lower surfaces of the support 22 are curved to suit the shape to which the leaf springs 23 and 24 have been constrained, and clamping members 26 and 27, with complementary shaped surfaces, are provided to secure the springs 23 and 24 to the end portions 16 and the support 22, respectively, with the aid of screw clamping devices 28 passing through suitable apertures in the springs. The sets of springs 23, 24 each comprise a pair of leaves 23a, 24a, respectively, and the portions of the springs 23, 24 passing into the end portions 16 and the support 22 are interleaved (see Figures 4 and 5) so that the pair of leaves of each set serve to space apart the adjacent pair of leaves of the other set.

The support 22 is slotted slidably to receive a crosshead 29 provided with an adjusting screw 31 rotatable by a knurled knob 32 to slide the cross-head 29 up or down in the slotted support 22. Attached to the ends of the cross-head 29 and to the lower end portions 16 are complementary abutment members 33 between which are arranged supplementary compression springs 34 assisting the leaf springs 23 and 24 to support the load. Adjustment of the compression of the springs 34 by the screw 31 serves to vary the pre-load capacity of the unit, and thus enables different loads to be supported on the mounting in the datum position.

The support 22 is secured to a base plate 36 itself adapted for attachment to a framework 37, the base plate 36 being provided with a calibrated scale 38 indicating the pre-load capacity of the unit for different loads. A casing 40 secured to the base plate 36 encloses the mounting. Two, four or more mountings may be used to support a given load 39, the mountings being secured to a common framework 37 while the load 39 is attached by cleats 41 to the central portions 12 of the upper members of the load-supporting members 11.

The mounting described above is intended to support a load of up to 10 lbs. in a condition of low positive stiffness in a datum position and having a natural frequency in the direction of gravitational force of the order of 2 cycles per second. The arrangement also provides that, with movement of the supported load vertically away from the datum position, the mounting will provide increasing positive stiffness.

To provide natural frequencies of the order of 2 cycles per second in the two horizontal directions at right angles to each other, the leaf springs 14 and 18 are so designed that, with the given load supported in the datum position, they will each be loaded endwise to within 60 to 80 percent of their Euler buckling load.

I claim:

1. A low stiffness non-linear spring unit for supporting a movable member with respect to a fixed member and comprising in combination: two sets of naturally flat leaf springs adapted to be symmetrically spaced about the movable member, one set being spaced in a load-supporting direction with respect to the other, said springs extending from the movable member to the other of said members and being secured to said members in positions to be constrained in a buckled condition to afford low positive stiffness support characteristics in the load-supporting direction and with respect to a supported load in a datum position and increasing positive stiffness against movement of the load away from the datum position in the load-supporting direction, the sets of said springs having pairs of leaves extending into interleaved relationship in the regions of securement to the two relatively movable members whereby a leaf of each set serves to space apart the adjacent pair of leaves of the other set.

2. A spring unit in accordance with claim 1 and in which one of said sets of springs is arranged above another and said sets are constrained at one end thereof and the upper set being buckled so that their center regions are above their constrained ends and the leaf springs in the lower set are buckled so that their center regions are below their constrained ends.

3. A spring mounting comprising a low-stiffness non-linear spring unit according to claim 1 for connecting a two-part load-supporting member, the connections including two groups of resilient members, the first group connecting one part of the load-supporting member to the spring unit and affording low positive stiffness in a first direction radially of the load-supporting direction, and the second group connecting the other part of the load-supporting member to the first part and affording low positive stiffness in a second radial direction normal to the first radial direction.

4. A spring mounting in accordance with the foregoing claim 3 and in which the resilient members are of naturally flat leaf spring type and adapted to be loaded endwise to within about 60 to 80% of their Euler buckling load.

5. A leaf spring mounted in accordance with claim 3 and in which the linear spring characteristics of the resilient members are modified by provision of shaped abutment surfaces against which said members bear as deflection takes place of a supported load radially with respect to the direction of load support.

References Cited in the file of this patent

UNITED STATES PATENTS

| | | |
|---|---|---|
| 820,944 | Adams | May 15, 1906 |
| 824,318 | Thorp | June 26, 1906 |
| 1,066,602 | Green et al. | July 8, 1913 |
| 2,751,262 | Federn et al. | June 19, 1956 |

FOREIGN PATENTS

| | | |
|---|---|---|
| 640,002 | France | Mar. 19, 1928 |